(12) United States Patent
Jang

(10) Patent No.: US 9,352,720 B2
(45) Date of Patent: May 31, 2016

(54) AIRBAG FOR VEHICLE

(71) Applicant: HYUNDAI MOBIS Co., Ltd., Yongin-si, Gyeonggi-do (KR)

(72) Inventor: Rae Ick Jang, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/524,021

(22) Filed: Oct. 27, 2014

(65) Prior Publication Data

US 2015/0183392 A1 Jul. 2, 2015

(30) Foreign Application Priority Data

Dec. 31, 2013 (KR) ........................ 10-2013-0168800

(51) Int. Cl.
*B60R 21/239* (2006.01)

(52) U.S. Cl.
CPC ....... *B60R 21/239* (2013.01); *B60R 2021/2395* (2013.01)

(58) Field of Classification Search
CPC .................. B60R 21/239; B60R 2021/2395
USPC ....................................................... 280/739
See application file for complete search history.

(56) References Cited

U.S. PATENT DOCUMENTS

| | | | | |
|---|---|---|---|---|
| 6,773,027 B2 * | 8/2004 | Bohn | ................ | B60R 21/239 280/729 |
| 6,773,030 B2 * | 8/2004 | Fischer | ................ | B60R 21/233 280/739 |
| 7,614,653 B2 * | 11/2009 | Rose | ................ | B60R 21/2338 280/739 |
| 7,878,542 B2 * | 2/2011 | Unno | ................ | B60R 21/2338 280/739 |
| 8,020,890 B2 * | 9/2011 | Webber | ................ | B60R 21/2338 280/739 |
| 9,027,962 B1 * | 5/2015 | Jang | ................ | B60R 21/239 280/743.1 |
| 2009/0212538 A1 * | 8/2009 | Abe | ................ | B60R 21/2338 280/729 |
| 2010/0140908 A1 * | 6/2010 | Abe | ................ | B60R 21/233 280/739 |
| 2011/0309605 A1 * | 12/2011 | Kumagai | ................ | B60R 21/2338 280/741 |
| 2013/0026744 A1 * | 1/2013 | Fischer | ................ | B60R 21/2338 280/742 |
| 2013/0147171 A1 * | 6/2013 | Shin | ................ | B60R 21/2338 280/743.2 |
| 2014/0175778 A1 * | 6/2014 | Choi | ................ | B60R 21/2338 280/743.2 |
| 2014/0217712 A1 * | 8/2014 | Nakamura | ................ | B60R 21/2338 280/739 |
| 2014/0265280 A1 * | 9/2014 | Borton | ................ | B60R 21/2338 280/743.2 |
| 2015/0183392 A1 * | 7/2015 | Jang | ................ | B60R 21/239 280/739 |
| 2015/0239422 A1 * | 8/2015 | Ishiguro | ................ | B60R 21/239 280/731 |
| 2015/0239424 A1 * | 8/2015 | Nebel | ................ | B60R 21/263 280/729 |

FOREIGN PATENT DOCUMENTS

| | | |
|---|---|---|
| JP | 2005-014861 | 1/2005 |
| KR | 10-2008-0103745 A | 11/2008 |
| KR | 10-2009-0026413 A | 3/2009 |

* cited by examiner

*Primary Examiner* — Karen Beck
(74) *Attorney, Agent, or Firm* — Paratus Law Group, PLLC

(57) ABSTRACT

The present invention relates to an airbag for a vehicle, including: an inflator; an airbag cushion which is deployed by high-pressure gas flowing into the airbag cushion from the inflator, and has a vent hole for discharging the flowing high-pressure gas to the outside; a vent cover which is disposed in the airbag cushion so as to close the vent hole; and a pocket which is disposed in the airbag cushion, connected with the vent cover, and moved after the airbag cushion is initially deployed, so as to allow the vent hole to be closed by the vent cover.

15 Claims, 4 Drawing Sheets

AIRBAG FOR VEHICLE

CROSS-REFERENCE TO RELATED APPLICATIONS

The present application claims priority to Korean Patent Application Number 10-2013-0168800 filed Dec. 31, 2013, the entire contents of which the application is incorporated herein for all purposes by this reference.

TECHNICAL FIELD

The present invention relates to an airbag for a vehicle, and more particularly, to an airbag for a vehicle, which adjusts internal pressure in an airbag cushion for a vehicle when the airbag cushion is deployed, thereby preventing injury to an occupant due to the airbag cushion.

BACKGROUND

In general, as a safety device for protecting an occupant, an airbag apparatus is provided in a vehicle, and at the time of an accident, gas generated from an inflator flows into an airbag cushion such that the airbag cushion is inflated to protect the occupant.

The airbag apparatus is installed at each part of the vehicle as necessary, and there are a driver airbag (DAB) which is mounted on a steering wheel to protect a driver, a passenger airbag (PAB) which is mounted at an upper side of a glove box to protect a passenger seated in a front passenger seat, and a curtain airbag (CAB) which is mounted along a roof rail to protect a side of an occupant.

The airbag apparatuses are operated as an airbag control unit (ACU) controls the inflator, which is a gas generating means, in accordance with a signal detected by a sensor that senses a vehicle accident.

That is, when gas is generated as a gas generating medium in the inflator explodes by a control command of the ACU, the gas flows into the airbag cushion, and the airbag cushion is inflated and deployed by pressure of the gas flowing into the airbag cushion, thereby protecting a passenger.

However, in a case in which internal pressure in the airbag cushion is low for the latter half of a period when the airbag cushion is deployed at the time of a high-speed collision of the vehicle, severity of injury to the neck is increased. On the contrary, in a case in which the internal pressure is high, severity of injury to the head is increased.

In a case in which a closed vent is applied to the airbag cushion and the number of vent holes is increased in order to reduce injury to the occupant, impact to the head of the occupant is delayed by the airbag cushion, but severity of injury to the head tends to be increased at a point of time at which a vent hole is closed.

In a case in which an active vent with an open structure is applied to the airbag cushion, the severity of injury to the head of the occupant may be reduced, but there is a problem in that the severity of injury to the neck is increased.

In order to prevent the aforementioned problem, a lower risk deployment (LRD) vent is provided in the airbag cushion, and the LRD vent is closed at a point of time at which the airbag cushion is fully deployed, thereby reducing the severity of injury. However, there is a problem in that the LRD vent increases costs and the number of working processes.

SUMMARY

The present invention has been made in an effort to provide an airbag for a vehicle, which reduces severity of injury to a neck of an occupant by adjusting internal pressure in an airbag cushion when the airbag cushion is deployed.

Technical problems of the present invention are not limited to the aforementioned technical problems, and other technical problems, which are not mentioned above, may be clearly understood by those skilled in the art from the following descriptions.

An exemplary embodiment of the present invention provides an airbag for a vehicle, including: an inflator; an airbag cushion which is deployed by high-pressure gas flowing into the airbag cushion from the inflator, and has a vent hole for discharging the flowing high-pressure gas to the outside; a vent cover which is disposed in the airbag cushion so as to close the vent hole; and a pocket which is disposed in the airbag cushion, connected with the vent cover, and moved when the airbag cushion is deployed, so as to allow the vent hole to be closed by the vent cover.

An opening may be formed in the airbag cushion, and the pocket may be disposed so that at least a part of the pocket protrudes to the outside from the airbag cushion through the opening when the airbag cushion is deployed.

The vent cover may be disposed at a position opposite to a position of the pocket based on the vent hole.

The vent cover may be sewed on the airbag cushion in a state in which the vent cover is folded in a multilayered shape.

The vent cover may be sewed so that an upper folded portion of the vent cover is torn before a lower folded portion of the vent cover is torn.

The vent cover and the pocket may be connected by straps, and the straps may include left and right straps that connect both sides of the vent cover and both sides of the pocket.

A strap holder may be attached to the airbag cushion, and the strap may be movably fitted between the airbag cushion and the strap holder.

The strap may be sewed on the airbag cushion so that the strap is torn from the airbag cushion when the pocket is moved toward the opening.

The pocket may be connected with a tether that prevents the pocket from being moved when the airbag cushion is initially deployed, the tether may be connected with a tether tension unit that prevents the tether from being moved until a predetermined time elapses after the airbag cushion is deployed, and the tether may be sewed on the airbag cushion so that the tether may be torn from the airbag cushion.

The tether may include left and right tether portions that are connected with both sides of the pocket.

A tether holder, which guides the movement of the tether, may be installed on the airbag cushion between the pocket and the vent hole.

A connecting member by which one end of the strap is sewed may be attached to the pocket, and ends of the left and right tether portions of the tether may be sewed on the connecting members.

Other detailed matters of the exemplary embodiment of the present invention are included in the detailed description and the drawings.

According to the airbag for a vehicle of the present invention, there are one or more effects as follows.

In order to adjust internal pressure when the airbag cushion is deployed, the vent hole is opened when the airbag is deployed, and then the vent hole is covered at a point of time at which the airbag cushion is fully deployed, thereby reducing severity of injury to the occupant.

Installation of an LRD vent may be eliminated, thereby reducing the number of components of the airbag, simplifying a manufacturing process, and reducing costs.

The effects of the present invention are not limited to the aforementioned effects, and other effects, which are not mentioned above, will be clearly understood by those skilled in the art from the claims.

DETAILED DESCRIPTION

Figure 1:
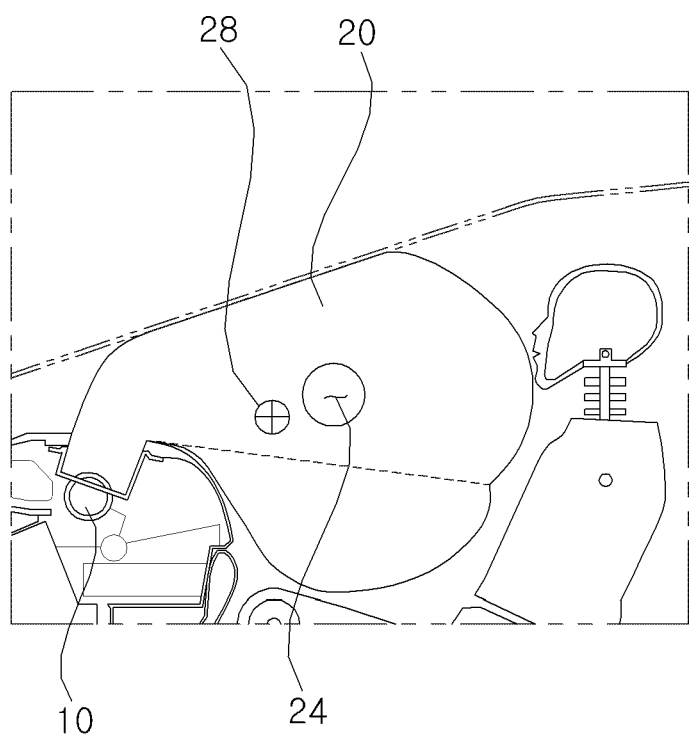
FIG. 1 is a side view illustrating an airbag for a vehicle according to an exemplary embodiment of the present invention.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag for a vehicle according to the present invention will be described with reference to the drawings in which the exemplary embodiment of the present invention is illustrated.

The airbag for a vehicle according to the exemplary embodiment of the present invention may be modified by those skilled in the art.

Figure 2:
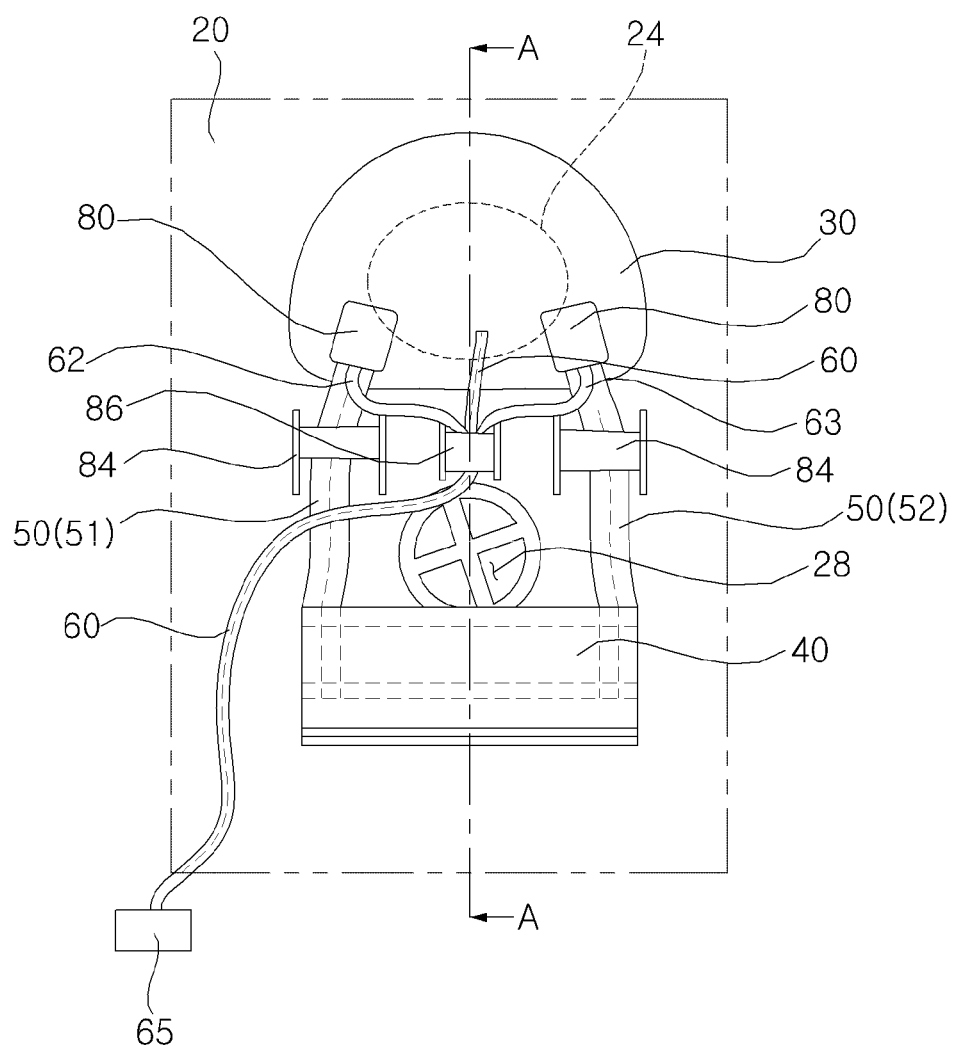
FIG. 2 is a front view of the airbag for a vehicle according to the exemplary embodiment of the present invention.
Figure 3:
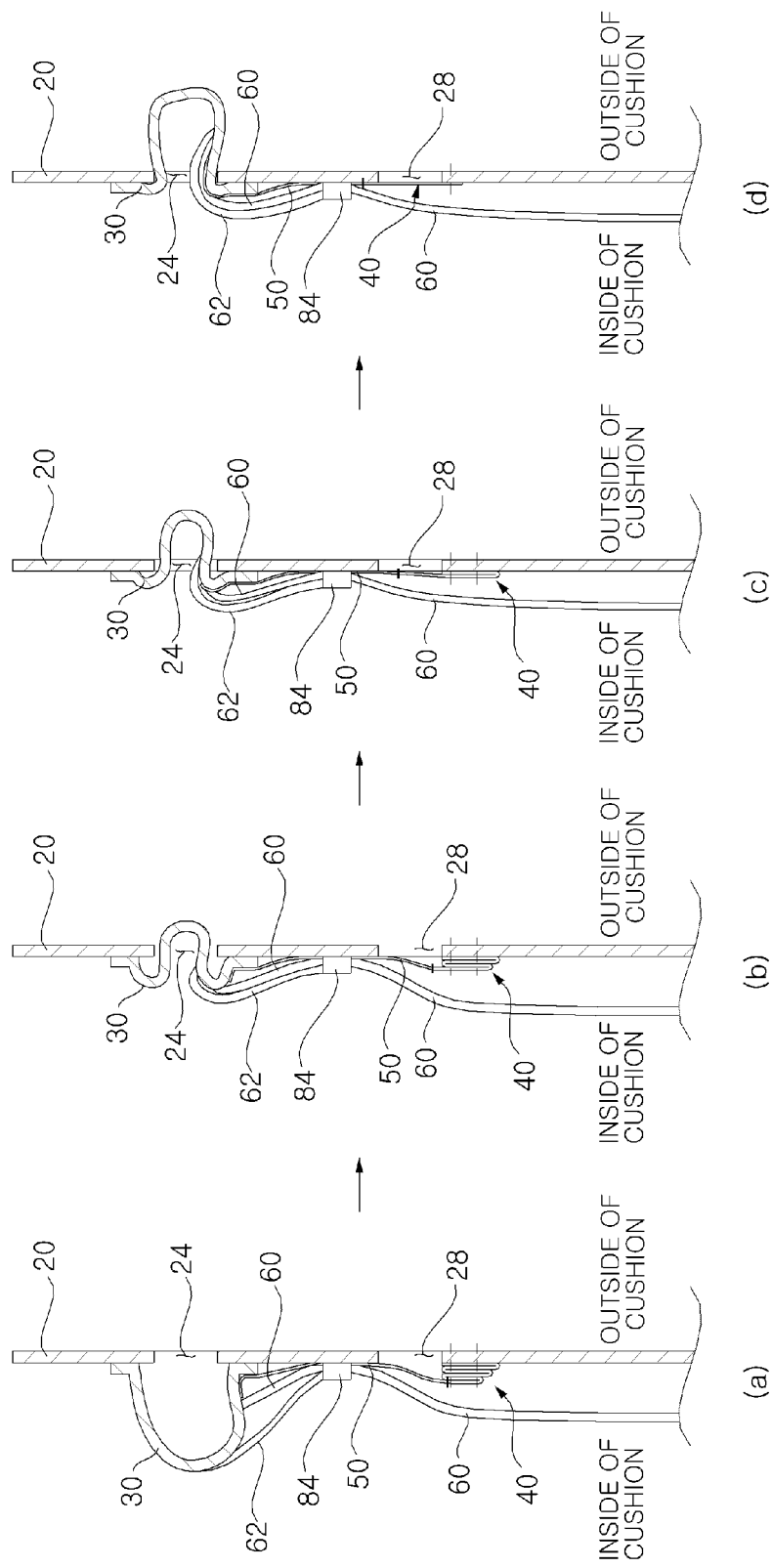
FIG. 3 is a partial cross-sectional view taken along line A-A of FIG. 2, that is, a cross-sectional view of the airbag cushion in accordance with a deployment sequence.

Referring to FIGS. 1 to 3, the airbag for a vehicle according to the exemplary embodiment of the present invention includes an inflator 10 which discharges gas at the time of a vehicle collision, an airbag cushion 20 which is deployed by an inflow of the gas, a vent hole 28, a vent cover 40 which covers the vent hole 28, and a pocket 30 which is connected with the vent cover 40.

The inflator 10 is operated at the time of a vehicle collision in order to provide high-pressure gas into the airbag cushion 20.

High-pressure gas produced in the inflator 10 flows into the airbag cushion 20, such that the airbag cushion 20 is deployed toward the passenger.

The vent hole 28 is formed to discharge a part of high-pressure gas, which flows into the airbag cushion 20 from the inflator 10, to the outside. An opening 24 is formed in the airbag cushion 20 at a position adjacent to the vent hole 28, and the pocket 30 is disposed to protrude to the outside from the airbag cushion 20 through the opening 24.

The opening 24 is formed at one side of the vent hole 28. Although the opening 24 is illustrated to be greater than the vent hole 28, the opening 24 may have the same size as the vent hole 28, or may have a smaller size than the vent hole 28. The pocket 30 is disposed in the airbag cushion 20 so as to close the opening 24.

The vent hole 28 discharges a part of high-pressure gas flowing into the airbag cushion 20 when the airbag cushion 20 is deployed, thereby preventing the occupant from being injured by excessive deployment pressure of the airbag cushion 20.

In order to cover the vent hole 28, the vent cover 40 is sewed in the airbag cushion 20 so that the vent cover 40 may be torn.

The pocket 30 is connected with the vent cover 40 by straps 50, and at least a part of the pocket 30 protrudes to the outside from the airbag cushion 20 through the opening 24 when a predetermined time has elapsed after the airbag cushion 20 is initially deployed, such that the vent cover 40 is moved toward the vent hole 28 so as to cover the vent hole 28.

The pocket 30 is formed to be larger than the opening 24, and sewed in the airbag cushion 20 so as to cover the opening 24.

The vent cover 40 is sewed in a folded state at a position opposite to a position of the pocket 30 based on the vent hole 28. The vent cover 40 may be folded so that an upper folded portion of the vent cover 40 has a smaller area than a lower folded portion of the vent cover 40.

The vent cover 40 is securely sewed so as not to be disconnected from the strap 50. Meanwhile, the vent cover 40 is sewed on the airbag cushion 20 so that the vent cover 40 may be torn from the airbag cushion 20 when the strap 50 is pulled by the pocket 30, and left and right straps 51 and 52 are sewed at left and right sides of the vent cover 40 so that the vent cover 40 is uniformly torn when the airbag cushion 20 is deployed. In order to cover the vent hole 28, the vent cover 40 is formed in the same shape as the vent hole 28 or in a rectangular shape, and formed to be larger than the vent hole 28.

One end of the strap 50 is connected with the pocket 30 so that the strap 50 may be pulled when the pocket 30 is moved toward the opening 24, and the sewed portion of the vent cover 40 may be torn. Strap holders 84 are installed on the airbag cushion 20 so that the straps 50 are guided when the pocket 30 is moved, and the straps 50 are slidably fitted between the strap holders 84 and the airbag cushion 20.

In order to prevent the strap 50 from being moved when the vehicle travels, the strap 50 is sewed on the airbag cushion 20 so that the strap 50 may be torn from the airbag cushion 20. The sewed portion of the strap 50 is torn from the airbag cushion 20 when the pocket 30 is moved toward the opening 24. Meanwhile, ends of the straps 50 are connected to the pocket 30 together with left and right tether portions 62 and 63, which will be described below, by connecting members 80.

One end of the tether 60 is connected to a tether tension unit 65 such that the pocket 30 may not be moved to the outside from the airbag cushion 20 through the opening 24 until the airbag cushion 20 is initially deployed, and the tether 60 may be moved as the tether 60 is disconnected from the tether tension unit 65 when a predetermined time has elapsed. The other end of the tether 60 is connected to a central portion of the pocket 30. In order to allow the tether 60 to uniformly support the pocket 30 before the pocket 30 is moved to the outside from the opening 24, the left and right tether portions 62 and 63 branch off from an upper portion of the tether 60, and ends of the left and right tether portions 62 and 63 are connected to both sides of the pocket 30.

The tether 60 may be sewed on the airbag cushion 20 so that the tether 60 may be torn from the airbag cushion 20.

When a predetermined time has elapsed after the airbag cushion 20 is deployed, the tether 60 is disconnected from the tether tension unit 65, and the sewed portion with the airbag cushion 20 is torn as the airbag cushion 20 is deployed, such that the pocket 30 is moved to the outside through the opening 24 by high-pressure gas flowing into the airbag cushion 30. A tether holder 86, which prevents the tether 60 from being moved away, is installed between the vent hole 28 and the opening 24 of the airbag cushion 20, and the tether 60 is movably fitted between the tether holder 86 and the airbag cushion 20. Meanwhile, the strap holders 84, and the tether holder 86 may be horizontally disposed.

An operation of the airbag for a vehicle according to the exemplary embodiment of the present invention, which is configured as described above, will be described below.

Figure 4:
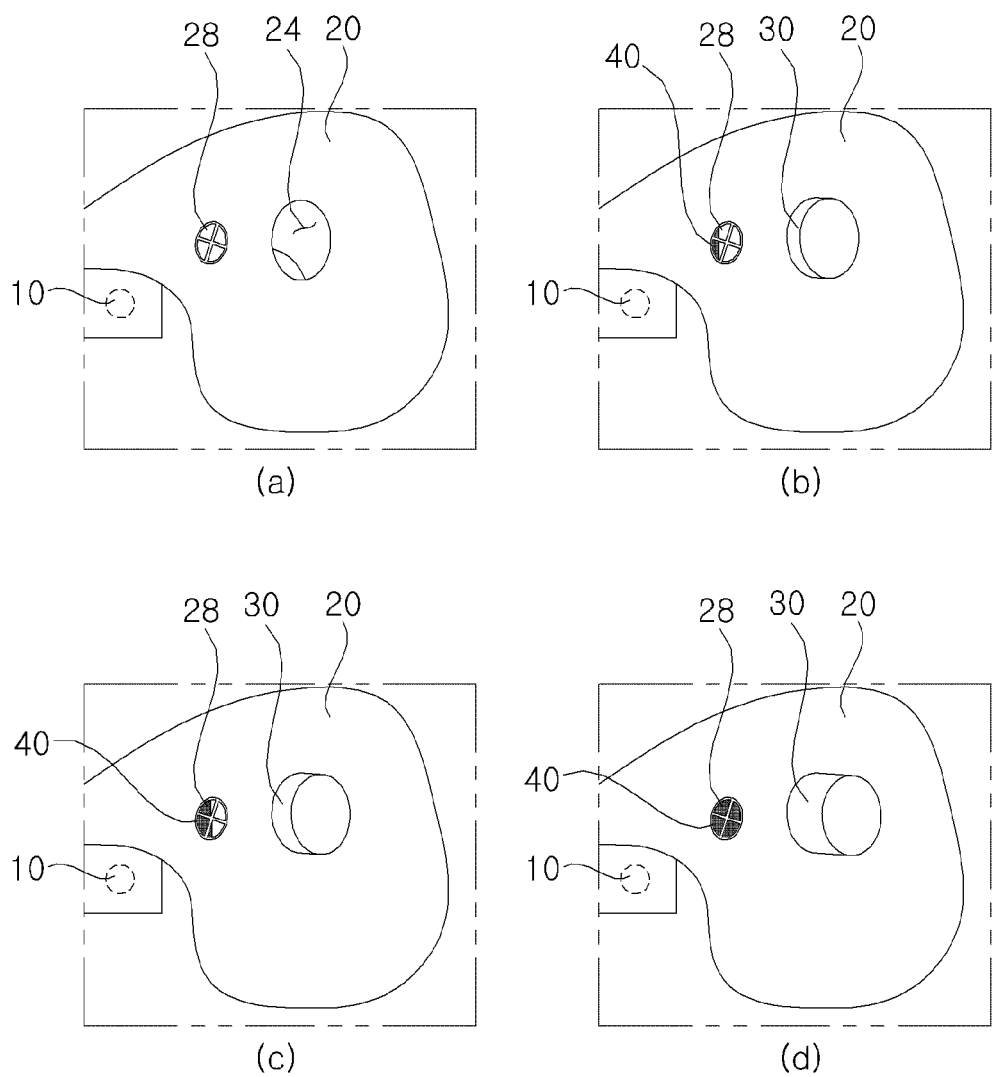
FIG. 4 is a side view of the airbag cushion in accordance with the deployment sequence of FIG. 3.

FIG. 3 is a cross-sectional view illustrating the airbag cushion in accordance with a deployment sequence, and FIG. 4 is a side view illustrating the airbag cushion in accordance with the deployment sequence.

Referring to FIGS. 3 and 4, at the time of a collision accident of the vehicle, the inflator is operated and discharges high-pressure gas, the high-pressure gas flows into the airbag cushion 20, and the airbag cushion 20 is deployed toward an occupant.

As illustrated in FIGS. 2, 3A and 4A, when the airbag cushion is initially deployed, the airbag cushion 20 is deployed toward a passenger in a state in which the tether tension unit 65 is connected with the tether 60, and a part of the high-pressure gas flowing into the airbag cushion 20 is discharged to the outside through the vent hole 28. In this case, since the tether 60 is still connected with the tether tension unit 65, the pocket 30 cannot protrude to the outside from the opening 24 by tension of the tether 60, and as a result, a sewed state between the straps 50 and the vent cover 40 is maintained, and an opened state of the vent hole 28 is also maintained.

As illustrated in FIGS. 3B and 4B, when a predetermined time, for example, 60 ms has elapsed after the airbag cushion 20 begins to be deployed, a signal is transmitted to the tether tension unit, and the tether 60 is disconnected from the tether tension unit such that the tether 60 may be moved. As a result, the pocket 30 begins to protrude to the outside through the opening 24 by internal pressure in the airbag cushion 20, and as the sewed portion is torn, tension is applied to the straps 50 so that the straps 50 may be moved together with the pocket 30. Accordingly, as the sewed portion of the vent cover 40 is also torn, the vent cover 40 is moved toward the vent hole 28, such that the vent hole 28 begins to be covered.

As illustrated in FIGS. 3C and 4C, when a predetermined time has elapsed from this state, the pocket 30 further protrudes to the outside from the airbag cushion 20 through the opening 24, and the strap 50 further pulls the vent cover 40 toward the vent hole 28, such that the remaining sewed portion of the vent cover 40 is torn, and as a result, the vent hole 28 is further covered.

When a predetermined time, for example, 65 ms has elapsed after the airbag cushion 20 is deployed, the pocket 30 completely protrudes to the outside from the airbag cushion 20 through the opening 24, and the vent hole 28 is completely covered, thereby preventing the high-pressure gas flowing into the airbag cushion 20 from being discharged.

Therefore, the vent hole 28 begins to be covered from a predetermined time after the airbag cushion 20 is deployed, and the vent hole 28 is completely covered when the airbag cushion 20 is fully deployed, such that internal pressure in the airbag cushion is not rapidly increased, thereby reducing severity of injuries to the head and the neck of the occupant due to high deployment pressure of the airbag cushion.

While the exemplary embodiment of the present invention has been illustrated and described above, the present invention is not limited to the aforementioned specific exemplary embodiment, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An airbag for a vehicle, comprising:
an inflator;
an airbag cushion which is deployed by high-pressure gas flowing into the airbag cushion from the inflator, and has a vent hole for discharging the flowing high-pressure gas to the outside;
a vent cover which is disposed in the airbag cushion so as to close the vent hole; and
a pocket which is disposed in the airbag cushion, connected with the vent cover, and moved after the airbag cushion is initially deployed, so as to allow the vent hole to be closed by the vent cover,
wherein an opening is formed in the airbag cushion, such that at least a part of the pocket is moved to the outside from the airbag cushion through the opening.

2. The airbag of claim 1, wherein the vent cover is disposed at a position opposite to a position of the pocket based on the vent hole.

3. The airbag of claim 1, wherein the vent cover is sewed in a state in which the vent cover is folded in a multilayered shape.

4. An airbag for a vehicle, comprising:
an inflator;
an airbag cushion which is deployed by high-pressure gas flowing into the airbag cushion from the inflator, and has a vent hole for discharging the flowing high-pressure gas to the outside;
a vent cover which is disposed in the airbag cushion so as to close the vent hole; and
a pocket which is disposed in the airbag cushion, connected with the vent cover, and moved after the airbag cushion is initially deployed, so as to allow the vent hole to be closed by the vent cover,
wherein the vent cover is sewed in a state in which the vent cover is folded in a multilayered shape,
wherein the vent cover is sewed so that an upper folded portion of the vent cover is torn before a lower folded portion of the vent cover is torn.

5. The airbag of claim 1, further comprising:
a strap which connects the vent cover and the pocket.

6. An airbag for a vehicle, comprising:
an inflator;
an airbag cushion which is deployed by high-pressure gas flowing into the airbag cushion from the inflator, and has a vent hole for discharging the flowing high-pressure gas to the outside;
a vent cover which is disposed in the airbag cushion so as to close the vent hole;
a pocket which is disposed in the airbag cushion, connected with the vent cover, and moved after the airbag cushion is initially deployed, so as to allow the vent hole to be closed by the vent cover; and
a strap which connects the vent cover and the pocket,
wherein the strap includes left and right straps which connect both sides of the vent cover and both sides of the pocket.

7. The airbag of claim 5, wherein a strap holder is attached to the airbag cushion, and the strap is movably fitted between the airbag cushion and the strap holder.

8. The airbag of claim 5, wherein the strap is sewed on the airbag cushion so that the strap is torn when the pocket is moved toward the opening.

9. The airbag of claim 1, wherein the pocket is connected with a tether that prevents the pocket from being moved when the airbag cushion is initially deployed.

10. An airbag for a vehicle, comprising:
    an inflator;
    an airbag cushion which is deployed by high-pressure gas flowing into the airbag cushion from the inflator, and has a vent hole for discharging the flowing high-pressure gas to the outside;
    a vent cover which is disposed in the airbag cushion so as to close the vent hole; and
    a pocket which is disposed in the airbag cushion, connected with the vent cover, and moved after the airbag cushion is initially deployed, so as to allow the vent hole to be closed by the vent cover,
    wherein the pocket is connected with a tether that prevents the pocket from being moved when the airbag cushion is initially deployed,
    wherein the tether is connected with a tether tension unit that prevents the tether from being moved until a predetermined time elapses after the airbag cushion is deployed.

11. The airbag of claim 9, wherein the tether is temporarily joined to the airbag cushion.

12. An airbag for a vehicle, comprising:
    an inflator;
    an airbag cushion which is deployed by high-pressure gas flowing into the airbag cushion from the inflator, and has a vent hole for discharging the flowing high-pressure gas to the outside;
    a vent cover which is disposed in the airbag cushion so as to close the vent hole; and
    a pocket which is disposed in the airbag cushion, connected with the vent cover, and moved after the airbag cushion is initially deployed, so as to allow the vent hole to be closed by the vent cover,
    wherein the pocket is connected with a tether that prevents the pocket from being moved when the airbag cushion is initially deployed,
    wherein the tether includes left and right tether portions that are connected with both sides of the pocket.

13. The airbag of claim 9, wherein a tether holder, which guides the movement of the tether, is installed on the airbag cushion between the pocket and the vent hole.

14. The airbag of claim 5, wherein a connecting member by which one end of the strap is sewed is attached to the pocket.

15. An airbag for a vehicle, comprising:
    an inflator;
    an airbag cushion which is deployed by high-pressure gas flowing into the airbag cushion from the inflator, and has a vent hole for discharging the flowing high-pressure gas to the outside;
    a vent cover which is disposed in the airbag cushion so as to close the vent hole;
    a pocket which is disposed in the airbag cushion, connected with the vent cover, and moved after the airbag cushion is initially deployed, so as to allow the vent hole to be closed by the vent cover;
    a strap which connects the vent cover and the pocket,
    wherein ends of left and right tether portions of the tether, which prevents the pocket from being moved, are sewed on the connecting members.

* * * * *